United States Patent [19]
Kerpash, Sr.

[11] Patent Number: 5,890,546
[45] Date of Patent: Apr. 6, 1999

[54] TRACTOR DRAWN SCRAPER WITH FOLDING WINGS

[76] Inventor: Robert S. Kerpash, Sr., 1104 Bohemian Church Rd., Troy, Mo. 63379

[21] Appl. No.: 788,607

[22] Filed: Jan. 24, 1997

[51] Int. Cl.⁶ .................................................. A01B 15/00
[52] U.S. Cl. ........................ 172/684.5; 172/776; 172/675; 172/701.1; 172/397; 172/799.5; 37/271
[58] Field of Search .................................. 172/684.5, 720, 172/722, 730, 776, 271, 675, 701.1, 397, 799.5; 37/274, 281, 266, 207, 271

[56] References Cited

U.S. PATENT DOCUMENTS

| | | |
|---|---|---|
| 1,982,219 | 11/1934 | McAllister . |
| 2,051,283 | 8/1936 | Austin . |
| 3,279,104 | 10/1966 | Wandscheer et al. ................. 37/281 X |
| 3,474,550 | 10/1969 | Frank . |
| 3,908,289 | 9/1975 | Ross ................................. 172/684.5 X |
| 4,019,268 | 4/1977 | Waterman . |
| 4,077,139 | 3/1978 | Fagervold et al. ..................... 37/281 X |
| 4,269,273 | 5/1981 | Colville . |
| 4,356,645 | 11/1982 | Hine et al. . |
| 4,357,766 | 11/1982 | Croteau et al. ............................ 37/281 |
| 4,479,312 | 10/1984 | Turgeon . |
| 4,568,219 | 2/1986 | Berry ............................... 172/684.5 X |
| 4,676,321 | 6/1987 | Friggstad ................................. 172/776 |
| 4,821,809 | 4/1989 | Summach et al. .................. 172/776 X |
| 4,898,247 | 2/1990 | Springfield . |
| 4,905,387 | 3/1990 | Street . |
| 5,285,588 | 2/1994 | Niemela et al. ....................... 37/274 X |
| 5,289,880 | 3/1994 | Barto . |
| 5,437,113 | 8/1995 | Jones ..................................... 37/274 X |
| 5,529,131 | 6/1996 | Van Ornum ....................... 172/776 X |
| 5,655,318 | 8/1997 | Daniels .................................. 37/281 X |

Primary Examiner—Terry Lee Melius
Assistant Examiner—Victor Batson
Attorney, Agent, or Firm—Litman, McMahon & Brown L.L.C.

[57] ABSTRACT

A tractor drawn scraper apparatus with folding wings includes a main frame with a main blade assembly depending therefrom and wing frames with wing blade assemblies depending therefrom. The wing frames are pivotally connected to laterally opposite ends of the main frame and are pivoted by the action of hydraulic cylinders connected between the main frame and the wing frames respectively. The wing frames are lowered for soil engagement and raised for transport. A wheel frame includes a wheel frame axle pivotally connected to the main frame by way of the main blade assembly and having a pair of radial wheel support arms with ground engaging wheels journaled thereon. A pair of wheel frame cylinders engaged between the main frame and the wheel support arms are activated to raise the wheels for soil engagement by the blade assemblies and to lower the wheels for transport. A tongue assembly extends forwardly from the main frame for hitching to a tractor to draw the blade assemblies over a soil surface.

21 Claims, 3 Drawing Sheets

TRACTOR DRAWN SCRAPER WITH FOLDING WINGS

BACKGROUND OF THE INVENTION

Large scale earth grading operations are typically carried out using specialized motor graders which tend to be large and expensive. On large construction projects, such as large housing tracts, highway construction, and the like, the use of such specialized graders can be justified in terms of size and efficiency. However, on smaller construction projects, the cost of transporting a large motor grader to a site and operational costs are inappropriate for the size of the job. Such smaller projects may include construction of smaller roads, contouring of farm land, landscaping for individual house construction sites, and the like.

For this reason, various types of smaller scale earth grading equipment have been developed which can be connected or hitched to general purpose work vehicles such as dozers, loaders, and agricultural type tractors. Such an approach requires a much lower investment in the grading equipment, and the vehicle to which it is connected can be utilized for other purposes. Smaller scale grading apparatus generally includes a curved scraper blade mounted on a supporting frame which can be lowered into soil engagement and raised for movement between areas to be graded and for transport to and away from the construction site.

There are various advantages and disadvantages to locating the grader blade in front of the prime mover vehicle or behind the vehicle. An advantage of locating the blade in front of the vehicle is that a push blade provides generally better visibility since the operator only needs to look in a forward direction. A disadvantage of a front location of the blade is that imprints of the tires or tracks of the vehicle are usually left in the graded soil. With a rear located or drawn blade, the attention of the operator is divided between looking forward to properly steer the vehicle and for safety and looking backward to monitor the grading operation. However, with a drawn type blade, any impressions left by the draft vehicle are usually graded away by the blade.

It has been observed that grading operations using a transversely oriented scraper blade which is drawn tend to create a shallow rippling effect on the soil surface. Such undesirable rippling may result from changes in the working angle of the scraper blade as the tires of the draft vehicle follow the original contours of the soil surface to be graded.

Modern agricultural tractors have increased in size and in drawing power as the width and depth of agricultural soil working tool frames have increased. Increases in the width and depth of such tool frames have occurred to increase the area worked per unit of length travelled by the tractor and to perform multiple soil working operations with different sets of soil working tools in a given pass over the field. Because such agricultural tool frames must often be transported over roads and highways to and from the work site, vehicle width limits on such roads have resulted in the development of configurations of agricultural tool frames which can be reduced in width, such as by folding up wing sections of such frames. While, folding wing configurations of pushed grader blades have been developed, types of drawn grader blades which are known are limited in width to that which can be legally transported on roads or types which must be disassembled to avoid excessive width during transport.

SUMMARY OF THE INVENTION

The present invention provides a tractor drawn scraper apparatus with folding wings. A raised scraper main frame has a forwardly extending draft tongue with a vertically offset hitch end for hitching to a standard type of agricultural tractor and has a main blade assembly depending from a rear end of the main frame. Wing blade assemblies are pivotally connected to opposite lateral ends of the main frame and are moved between lower working positions and raised transport positions by hydraulic cylinders. The main blade assembly is of a built up or reinforced construction formed by a curved, transversely extending main blade member welded to a lower front edge of a rear transverse frame member and having a channel member welded to and extending along an intermediate segment of the main blade member. The channel has a rear web and forwardly extending flanges, the front edges of which are welded to the main blade member. A transversely extending upper brace plate is welded between a lower rear edge of the rear frame member and an upper rear edge of the channel member. A plurality of lower brace plates are positioned in transversely spaced relation and welded between a lower rear edge of the channel member and the main blade member near a lower edge thereof. Front brace struts extend diagonally between longitudinal members of the main frame and a front surface of the main blade member. A replaceable soil engaging element is releasably secured to the lower edge of the main blade, as by bolts, and can be replaced as wear occurs.

Each wing assembly includes triangular wing frames from which a wing blade assembly depends. The wing frames are pivotally connected to opposite ends of the main frame to enable pivoting about wing folding axes parallel to the direction of travel of the tractor. The wing blade assembly includes a wing blade member which is reinforced in a manner similar to the main blade, that is, using a forwardly open channel member which is welded to an intermediate segment of the wing blade member. The wing blade members also include a front diagonal brace strut and a replaceable wear element on a lower edge thereof. The triangular shape of the wing frames cause the wing blade members to be angled forwardly in an outward direction from the main frame. Such angling of the wing sections causes soil which is scraped up to amass within an area bounded by the main and wing blade members. This allows the operator to selectively deposit such soil where appropriate for use at the site or for hauling away, rather than spilling out the edges, to be scooped up as the next soil working pass is made. Additionally, it has been found that the forwardly angled end blade sections reduce tendencies of the grading operation to leave a rippled pattern in the soil surface.

A wheel frame assembly is pivotally connected to the main frame by way of the reinforcement channel of the main blade. A plurality of wheel frame lugs extend rearwardly from the channel member web and have a wheel frame axle journaled therethrough. A pair of trailing wheel support arms extend radially from the axle and have ground engaging wheels journaled thereon. Opposite ends of a pair of hydraulic cylinders are connected respectively to frame lugs on the main frame and to the wheel support arms. The wheels are pivoted down to raise the main blade and wing blades, if lowered, out of soil engagement. Raising the wheels lowers the blades into soil engagement. The wheels can also be pivoted to intermediate positions, such as to a few inches off the surface of the soil so that tires of the wheels form limits to the depth to which the scraper blades dig into the soil during grading. A pair of transport links extend rearwardly from the channel member and are positioned to receive the axle crank lug therebetween and pinned to positively secure the wheel assembly frame in the lowered position for transport.

The configuration of the scraper apparatus of the present invention can be modified such that the tongue and ground engaging wheel assembly are omitted. A three point hitch assembly is provided for connecting to a tractor having cooperating structure. Some modification of the scraper main frame is necessary for the three point arrangement; however, in most other respects such a three point hitch embodiment operates in a manner similar to the towed embodiment of the scraper apparatus described above.

OBJECTS AND ADVANTAGES OF THE INVENTION

The principal objects of the present invention are: to provide an improved apparatus for earth grading on relatively smaller construction projects; to provide such an apparatus which is usable with a conventional type of agricultural tractor and which is configurable to enable legal transport over roads and highways to and from work sites; to provide such an apparatus which does not leave imprints from the tractor on graded soil; to provide, in particular, a tractor drawn scraper apparatus with folding wings; to provide such an apparatus including a raised main frame having a forwardly extending hitch tongue with a lowered hitch end to couple to a conventionally located hitch pin of a standard type of agricultural tractor; to provide modifications of such an apparatus to enable connection of the apparatus to a three point hitch of a tractor; to provide such an apparatus including a curved main blade depending from a rear transverse member of the main frame, the blade being reinforced by a channel member and brace plates on a rear side and diagonal brace struts on a front side; to provide such an apparatus including trailing ground engaging wheels mounted on a wheel assembly frame pivotally connected to the reinforcement channel and pivoted between a lowered transport position and a raised soil working position by hydraulic cylinders connected to the main frame; to provide such an apparatus including wing blade assemblies pivotally connected to opposite ends of the main frame and pivoted by the action of hydraulic cylinders connected to the main frame; to provide such an apparatus which is of a width to allow transport over standard roads when the wing assemblies are pivoted upward to transport positions; to provide such an apparatus in which the wing blade assemblies are constructed and reinforced in a manner similar to the main blade and which are angled forward at their outer ends to prevent the movement of scraped up soil out the edges of the wing sections and to reduce tendencies of the grading to leave a rippled pattern in the graded soil surface; to provide such an apparatus in which the main blades and wing blades have removable soil engaging elements which can be replaced as wear thereof occurs; and to provide such a tractor drawn scraper with folding wings which is economical to manufacture and operate, which is durable and efficient in use, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a tractor drawn scraper apparatus with folding wing assemblies 2 which embodies the present invention. The scraper apparatus 1 generally includes a scraper main frame 3 having a main blade assembly 4 depending therefrom. The wing assemblies 2 are pivotally connected to the main frame 3. A wheel frame assembly 5 (FIG. 2) is pivotally connected to the main frame 3 and includes two pairs of ground engaging wheels 6. In general, the wheels 6 are lowered and the wing assemblies 2 raised for transport of the apparatus 1. The wheels 6 are raised and the wing assemblies 2 are lowered for grading soil 7 (FIG. 4).

Figure 1:
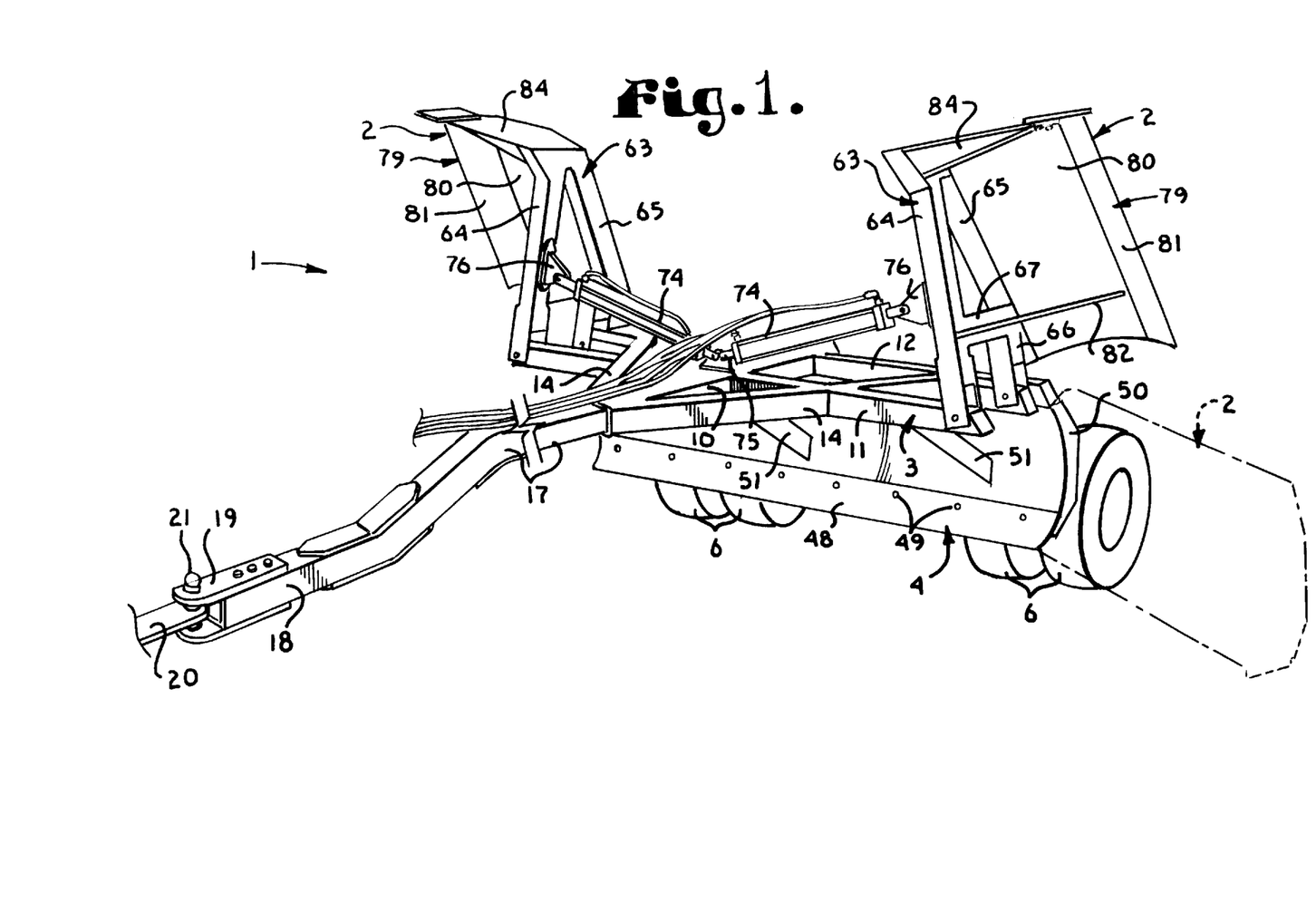
FIG. 1 is a perspective view of a tractor drawn scraper apparatus with folding wings which embodies the present invention, with wing blade assemblies shown in raised positions for transport and with a lowered position of one of the wing assemblies shown in phantom lines.
Figures 2, 5:
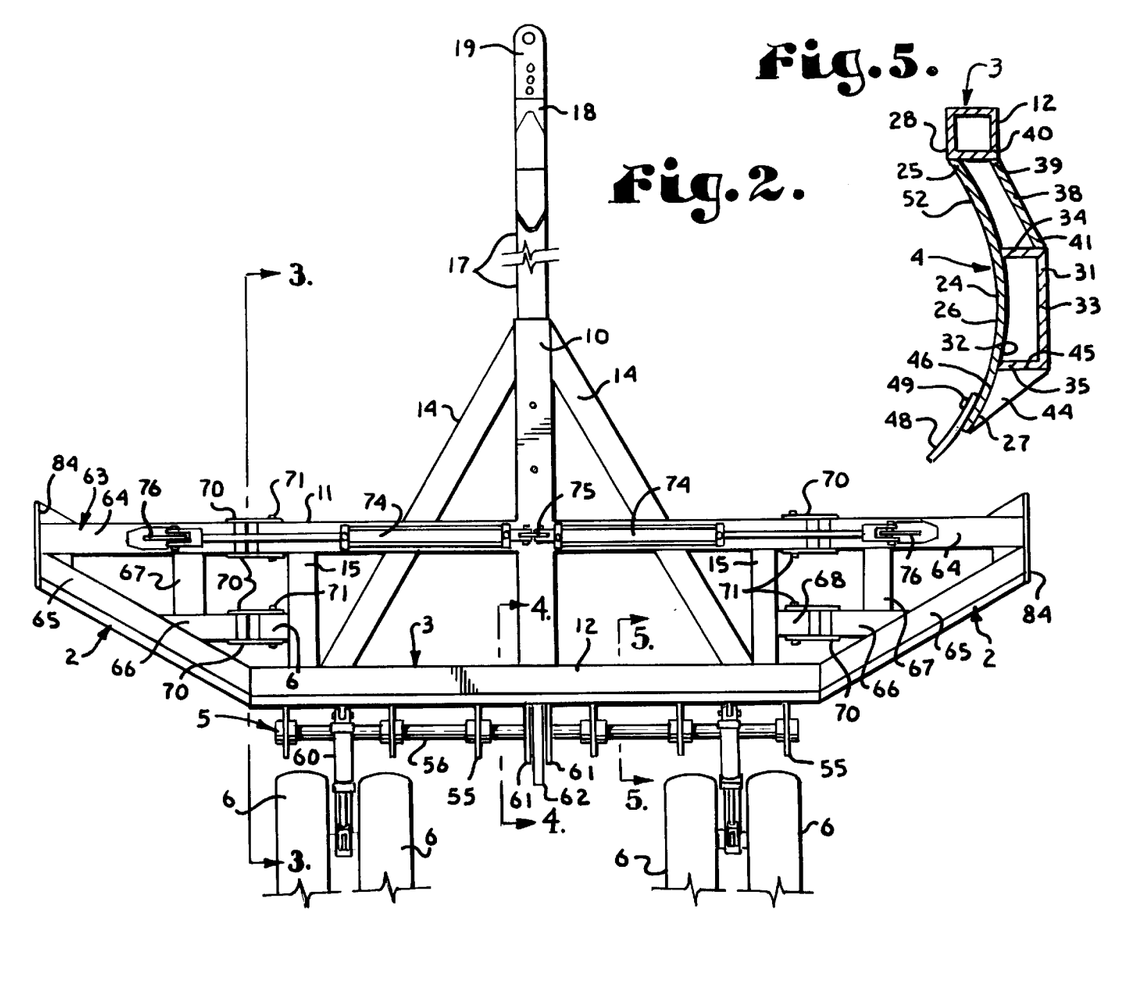
FIG. 2 is a fragmentary top plan view of the scraper apparatus of the present invention showing details of the main scraper frame and wing assembly frames thereof.
FIG. 5 is a further enlarged fragmentary sectional view taken on line 5—5 of FIG. 2 and shows construction details of the main blade assembly of the drawn scraper apparatus.
Figures 3, 4:
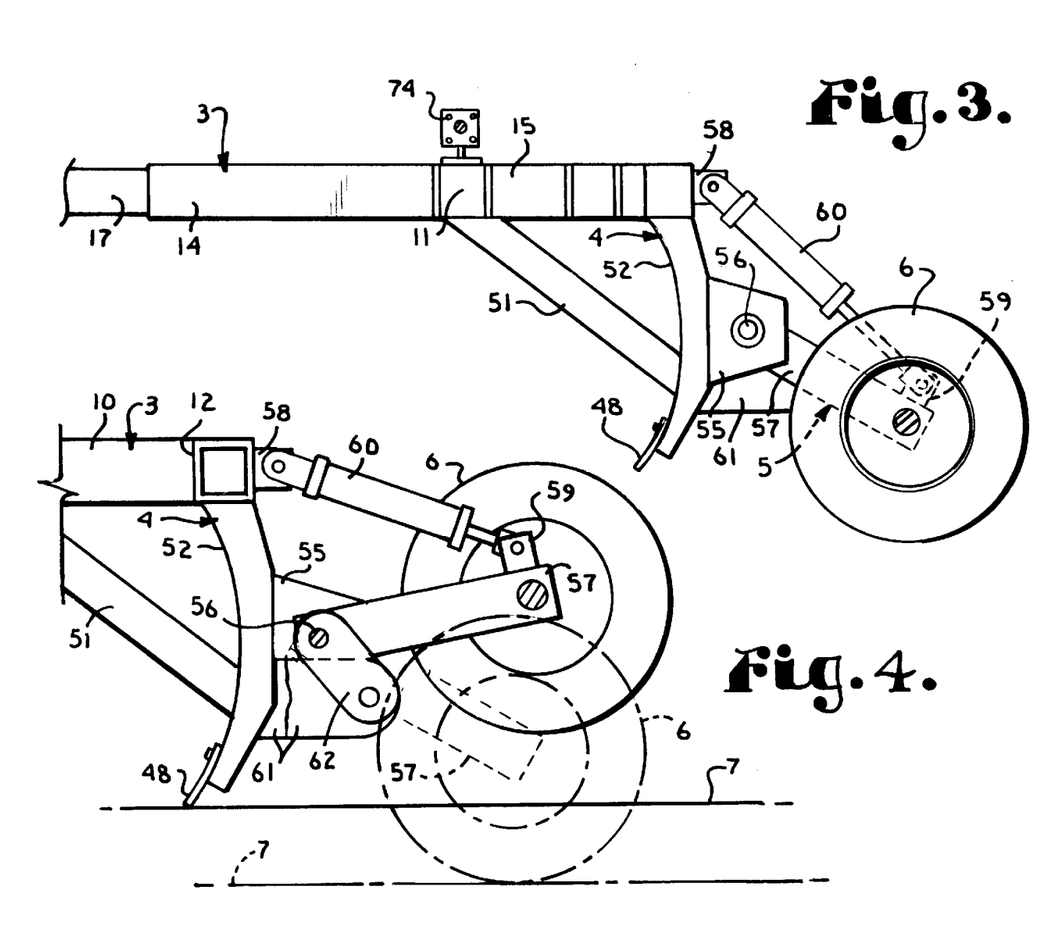
FIG. 3 is an enlarged longitudinal sectional view of taken on line 3—3 of FIG. 2 showing additional details of the main scraper frame and the wheel frame assembly.
FIG. 4 is a further enlarged fragmentary sectional view taken on line 4—4 of FIG. 2 showing operational details of the wheel frame assembly, with a lowered position of the ground engaging wheels shown in phantom lines.

Referring particularly to FIGS. 1 and 2, the illustrated main frame 3 includes a center longitudinal member 10, a front transverse member 11, a rear transverse member 12, right and left diagonal members 14, and right and left end members 15. The illustrated frame members 10, 11, 12, 14, and 15 are all square cross section tubular beam members. A hitch tongue assembly 17 is telescoped within the center member 10 and has a vertically offset hitch end section 18 having members forming a hitch clevis 19 for connecting with a drawbar 20 of a conventional agricultural tractor (not shown) by means of a vertical hitch pin 21.

Although not illustrated, it is contemplated that the main scraper frame 3 could be modified for connection to a tractor using a three point hitch arrangement. Such modifications would include omission of the wheel frame assembly 5 and the tongue assembly 17, shortening of the center longitudinal member 10, and shortening of the diagonal frame members 14. Such modifications are considered to be within the capabilities of one skilled in the art of soil working frames and are intended to be encompassed within the scope and spirit of the present invention.

Referring particularly to FIG. 5, the main blade assembly 4 depends from the rear transverse frame member 12 and extends transversely of the main frame 3. The main blade assembly 3 includes a main blade member 24 which curves about a transverse axis (not shown) from an upper edge 25 through an intermediate segment 26 to a lower edge 27. The main blade member 24 secured to the frame member 12 by welding the upper edge 25 to a lower front edge 28 of the frame member 12.

The main blade assembly 4 is of a built-up construction and includes a reinforcing channel member 31 extending along a rear surface 32 of the main blade member 24. The channel member 31 has a rear web 33 with an upper flange 34 and a lower flange 35 extending forwardly therefrom. Front edges of the flanges 34 and 35 are welded to the rear surface 32 of the main blade member 24 along the intermediate segment 26 thereof. An upper brace plate 38 has an upper edge 39 welded to a lower rear edge 40 of the frame member 12, while a lower edge 41 of the plate 38 is welded to the channel member 31 along the junction of the upper flange 34 with the web 33. A plurality of lower gusset plates 44 have upper edges 45 welded to the channel member 31 along the lower flange 35 and front edges 46 welded to the rear surface 32 of the main blade member 24. The gusset plates 44 are spaced transversely along the main blade assembly 4.

An elongated soil engaging element 48 is releasably attached to the main blade member 24 along the lower edge 27 thereof by fasteners, such as bolts 49. The element 48 may be replaced when worn by engagement with the soil. Ends of the main blade assembly 4 are closed by end plates 50 (see FIG. 1). The main blade assembly 4 is further reinforced by a plurality diagonal brace struts 51 (FIG. 3) transversely spaced along the main blade assembly 4 and extending between the front frame member 11 and a front surface 52 of the main blade member 24.

Referring to FIGS. 2, 3, and 4, the illustrated wheel frame assembly 5 includes a plurality of wheel frame supporting lugs 55 transversely spaced along and extending rearwardly from the web 33 of the channel member 31. A wheel frame axle 56 is journaled through the lugs 55 and has radial wheel support arms 57 extending radially therefrom. Sets of dual ground engaging wheels 6 are journaled on outer ends of the arms 57. Each wheel support arm 57 has an upstanding lug 59 (FIGS. 3 and 4) adjacent its outer end. Cylinder connection lugs 58 extend rearwardly from the rear transverse frame member 12. A pair of wheel frame motors 60, in the form of a hydraulic cylinders, are pivotally connected between the lug 59 on the wheel support arms 57 and the cylinder connection lugs 58 on the transverse frame member 12. Extension of the cylinders 60 causes the wheels 6 to be lowered to thereby raise the main blade assembly 4 out of soil engagement, while retraction of the cylinders 60 raises the wheel frame assembly 5 thereby lowering the main blade assembly 4 into engagement with the soil 7.

The cylinders 60 may be retracted partially to raise the sets of wheels 6 only a few inches from the soil surface 7 so that the sets of wheels 6 function as limits to tendencies of the main blade 24 and blades of the wing assemblies 2 to dig into the soil surface 7 during grading. Because the wheels 6 rotate freely and are driven to gain traction on the soil surface 7, only minor imprinting by the wheels 6 occurs in the soil surface 7. A pair of transport links 61 (FIG. 4) extend rearwardly from the main blade assembly 4 and receive an axle crank 62 therebetween to receive a pin (not shown) to thereby positively lock the wheels 6 in a lower or transport position for transport of the apparatus 1.

While a single wheel frame axle 56 is described and illustrated whereby the wheel support arms 57 are pivoted simultaneously, the wheel support arms 57 and wheels 6 could, alternatively, be individually pivoted using separate axles and individual hydraulic controls (not shown) to allow tilting of the apparatus 1 about a longitudinal roll axis.

Referring to FIGS. 1 and 2, each of the wing assemblies 2 includes a wing frame 63 including a transverse front member 64, an angled rear member 65, a transverse medial stub member 66, and a longitudinally oriented member 67. Opposite lateral ends of the main frame 3 have a transverse stub member 68 extending outwardly from the end members 15. Each wing frame 63 is pivotally connected to the main frame 3 by sets of clevis plates 70 extending inwardly from the inner ends of the front member 64 and the medial stub 66 which engage pivot pins 71 extending through outer ends of the front member 11 and the transverse stub 68. The illustrated wing frames 63 are pivoted by a pair of hydraulic wing cylinders 74 pivotally connected between a common center lug 75 located on the center longitudinal member 15 and respective wing lugs 76 extending upwardly from the front frame members 64. Extension of the cylinders 74 lowers the wing frames 63, while retraction of the cylinders 74 raises the wing frames 63.

Each of the wing assemblies 2 includes a wing blade assembly 79 depending therefrom in the lowered position of the wing assemblies 2. The wing blade assemblies 79 (FIG. 1) are constructed similar to the construction of the main blade assemblies 4 and include a wing blade member 80 reinforced by a channel member, an upper brace plate, and lower gusset plates (none detailed separately). Each of the wing blade assemblies 79 includes a replaceable soil engaging member 81 which may be removed for replacement when worn. Each wing blade assembly 79 is further reinforced by a diagonal brace strut 82 extending between the front frame member 64 and the front surface of the wing blade member 80 and by an end plate 84. The rear frame members 65 and wing blades 80 are oriented at angles relative to the transverse orientation of the main blade assembly 4. The wing blades 80 are angled forward away from the center member 15 to form a partial enclosure which retains soil scraped up by the blade assemblies 4 and 79. The end plates 84 aid in preventing the flow of scraped up soil out the edges of the apparatus 1 as the soil 7 is graded. A further benefit of the forwardly angled wing blades 80 is an observed reduction in tendencies of the blades 80 and 24 to leave a rippled pattern in the soil surface 7 as a result of grading thereby.

It is to be understood that while certain forms of the present invention have been illustrated and described herein, it is not to be limited to the specific forms or arrangement of parts described and shown.

What is claimed and desired to secure by Letters Patent is:

1. A drawn land scraper apparatus comprising:

(a) a laterally extending main scraper frame having opposite lateral ends;

(b) a hitch assembly extending forwardly from said main scraper frame and enabling hitching said apparatus to a draft vehicle;

(c) a main scraper blade extending transverse to said main scraper frame, depending from said main scraper frame, and configured to grade a soil surface upon engaging same when said apparatus is drawn by said draft vehicle;

(d) a wing scraper blade attached to a wing frame which, in turn, is pivotally connected to one of said ends of said main scraper frame such that said wing frame and said wing blade are selectively pivotable about a substantially horizontal axis between a raised position and a lowered position, said wing blade being configured to grade said soil surface in said lowered position of said wing frame and being pivoted out of engagement with said soil surface when in said raised position; and (e) a wing motor engaged between said main scraper frame and said wing frame and selectively operable to pivot said wing blade about said substantially horizontal axis between said lowered position and said raised position.

2. An apparatus as set forth in claim 1 wherein:

(a) said wing blade is angled forwardly in a direction away from said main scraper frame toward a distal end of said wing blade.

3. An apparatus as set forth in claim 1 and including:

(a) a ground engaging wheel operatively connected to said main scraper frame; and (b) a wheel motor engaged between said main scraper frame and said wheel and selectively operable to move said wheel between a lowered position engaging said soil surface thereby raising said main blade out of engagement with said soil surface and a raised position out of engagement with said soil surface thereby lowering said main blade into engagement with said soil surface.

4. An apparatus as set forth in claim 1 wherein said wing blade, said wing frame and said wing motor are respectively a first wing blade, a first wing frame and a first wing motor, and including:

(a) a second wing scraper blade attached to a second wing frame which, in turn, is pivotally connected to an opposite end of said main scraper frame from said first wing blade such that said second wing frame and said second wing blade are selectively pivotable about a substantially horizontal axis between a raised position and a lowered position, said second wing blade being configured to grade said soil surface in said lowered position of said second wing blade and being pivoted out of engagement with said soil surface when in said raised position; and (e) a second wing motor engaged between said main scraper frame and said second wing frame and selectively operable to pivot said second wing blade between said lowered position and said raised position of said second wing blade.

5. An apparatus as set forth in claim 1 and including:

(a) said main scraper frame having a transverse frame member;

(b) said main blade being curved from an upper edge through an intermediate segment to a lower edge about a transverse main blade axis, said top edge of said main blade being secured to said transverse frame member;

(c) a main blade reinforcement channel member having a rear web and a pair of forwardly extending flanges including an upper flange and a lower flange, said flanges being secured a rear surface of said main blade at said intermediate segment;

(d) an upper brace plate extending transverse to said main scraper frame and having a top edge secured to said transverse frame member in spaced relating to said upper edge of said main blade and a bottom edge secured to said channel member along said upper flange; and (e) a plurality of lower gusset plates positioned in laterally spaced relation and having upper edges secured to said channel member along said lower flange and front edges secured to said main blade adjacent said lower edge of said main blade.

6. An apparatus as set forth in claim 1 wherein:

(a) said main blade includes an upper edge secured to said main scraper frame and an opposite lower edge; and (b) an elongated replaceable soil engaging element is releasably secured to said main blade along said lower edge of said main blade.

7. A drawn land scraper apparatus comprising:

(a) a transversely extending main scraper frame having opposite lateral ends;

(b) a draft tongue extending forwardly from said main scraper frame and enabling hitching said apparatus to a draft vehicle;

(c) a main scraper blade extending transverse to said main scraper frame, depending from said main scraper frame, and configured to grade a soil surface upon engaging same when said apparatus is drawn by said draft vehicle;

(d) a pair of wing scraper blade assemblies, each said assembly being pivotally connected about a substantially horizontal axis to a respective opposite end of said main scraper frame, each wing blade assembly including a respective wing blade member attached to a respective wing frame with each respective wing blade being configured to grade said soil surface when the attached wing frame is pivoted downward to a respective lowered position and each respective wing blade being raised to an inoperative position out of engagement with said soil surface when the attached wing frame is pivoted to a raised position;

(e) a pair of wing motors engaged between said main scraper frame and respective ones of said wing blade assemblies, each said wing motor being selectively operable to pivot the respective wing frame between said lowered position and said raised position;

(f) a ground engaging wheel assembly connected to said main scraper frame and including at least one ground engaging wheel; and (g) a wheel assembly motor engaged between said main scraper frame and said wheel assembly and selectively operable to move said wheel assembly between a lowered position with said wheel engaging said soil surface thereby raising said main blade out of engagement with said soil surface and a raised position with said wheel out of engagement with said soil surface thereby lowering said main blade into engagement with said soil surface.

8. An apparatus as set forth in claim 7 wherein:

(a) each of said wing blades is angled forwardly in a direction away from said main scraper frame toward a distal end of the respective wing blade.

9. An apparatus as set forth in claim 7 wherein said wheel assembly includes:

(a) a wheel assembly frame pivotally connected to said main scraper frame to enable pivoting about a transverse wheel frame axis;

(b) at least a pair of ground engaging wheels journaled on said wheel assembly frame to enable rotation of said wheels about a transverse wheel rotation axis; and (c) said wheel assembly motor is a linear motor engaged between said scraper main frame and said wheel assembly frame.

10. An apparatus as set forth in claim 7 and including:
(a) said main scraper frame having a transverse frame member;
(b) said main blade being curved from an upper edge through an intermediate segment to a lower edge about a transverse main blade axis, said upper edge of said main blade being secured to said transverse extending frame member;
(c) a main blade reinforcement channel member having a rear web and a pair of forwardly extending flanges including an upper flange and a lower flange, said flanges being secured to a rear surface of said main blade at said intermediate segment;
(d) an upper brace plate extending transverse to said main scraper frame and having a top edge secured to said transverse frame member in spaced relation to said upper edge of said main blade and a bottom edge secured to said channel member along said upper flange; and
(e) a plurality of lower gusset plates positioned in transversely spaced relation and having upper edges secured to said channel member along said lower flange and front edges secured to said main blade between said intermediate segment and said lower edge of said main blade.

11. An apparatus as set forth in claim 7 wherein:
(a) said main blade includes an upper edge secured to said main scraper frame and an opposite lower edge; and
(b) an elongated replaceable soil engaging element is releasably secured to said main blade along said lower edge of said main blade.

12. A drawn land scraper apparatus comprising:
(a) a transversely extending main scraper frame having opposite lateral ends;
(b) a draft tongue extending forwardly from said main scraper frame and enabling hitching said apparatus to a draft vehicle;
(c) a main scraper blade extending transverse to said main scraper frame, depending from said main scraper frame, and configured to grade a soil surface upon engaging same when said apparatus is drawn by said draft vehicle;
(d) a pair of wing scraper blade assemblies, each said assembly being pivotally connected about a substantially horizontal axis to a respective opposite end of said main scraper frame, each wing blade assembly including a respective wing blade member attached to a respective wing frame with each respective wing blade being configured to grade said soil surface when the attached wing frame is pivoted downward to a respective lowered position and each respective wing blade being raised to an inoperative position out of engagement with said soil surface when the attached wing frame is pivoted to a raised position;
(e) each of said wing blades being angled forwardly in a direction away from said main scraper frame toward a distal end of the respective wing blade;
(f) a pair of wing motors engaged between said main scraper frame and respective ones of said wing blade assemblies, each said wing motor being selectively operable to pivot the respective wing frame between said lowered position and said raised position;
(g) a ground engaging wheel assembly connected to said main scraper frame and including a wheel assembly frame pivotally connected to said main scraper frame to enable pivoting about a transverse wheel frame axis;
(h) at least a pair of ground engaging wheels journaled on said wheel assembly frame to enable rotation of said wheels about a transverse wheel rotation axis; and
(i) a linear wheel assembly motor engaged between said scraper main frame and said wheel assembly frame and selectively operable to move said wheel assembly between a lowered position with said wheel engaging said soil surface thereby raising said main blade out of engagement with said soil surface and a raised position with said wheel out of engagement with said soil surface thereby lowering said main blade into engagement with said soil surface.

13. An apparatus as set forth in claim 12 and including:
(a) said main scraper frame having a transverse frame member;
(b) said main blade being curved from an upper edge through an intermediate segment to a lower edge about a transverse main blade axis, said upper edge of said main blade being secured to said transverse frame member;
(c) a main blade reinforcement channel member having a rear web and a pair of forwardly extending flanges including an upper flange and a lower flange, said flanges being secured to a rear surface of said main blade at said intermediate segment;
(d) an upper brace plate extending transverse to said main scraper frame and having a top edge secured to said transverse frame member in spaced relation to said upper edge of said main blade and a bottom edge secured to said channel member along said upper flange; and
(e) a plurality of lower gusset plates positioned in transversely spaced relation and having upper edges secured to said channel member along said lower flange and front edges secured to said main blade between said intermediate segment and said lower edge of said main blade.

14. An apparatus as set forth in claim 12 wherein:
(a) said main blade includes an upper edge secured to said main scraper frame and a lower edge; and
(b) an elongated replaceable soil engaging main element is releasably secured to said main blade along said lower edge of said main blade.

15. An apparatus as set forth in claim 12 wherein each of said wing blades includes a lower edge, and including:
(a) an elongated replaceable soil engaging wing element releasably secured to the respective wing blade along said lower edge of said respective wing blade.

16. A drawn land scraper apparatus comprising:
(a) a transversely extending main scraper frame having opposite lateral ends;
(b) a draft tongue extending forwardly from said main scraper frame and enabling hitching said apparatus to a draft vehicle;
(c) a main scraper blade extending transverse to said main scraper frame, depending from said main scraper frame, and configured to grade a soil surface upon engaging same when said apparatus is drawn by said draft vehicle, said main scraper frame having a transverse frame member and being curved from an upper edge through an intermediate segment to a lower edge about a transverse main blade axis, said upper edge of said main blade being secured to said transverse frame member;
(d) a pair of wing scraper blade assemblies pivotally connected to respective opposite ends of said main scraper frame, each wing blade assembly including a respective wing blade member configured to grade said soil surface in a respective lowered position and having a respective raised positioned pivoted out of engagement with said soil surface;

(e) each of said wing blades being angled forwardly in a direction away from said main scraper frame toward a distal end of the respective wing blade;

(f) a wing motor engaged between said main scraper frame and said wing blade assemblies and selectively operable to pivot said wing blade assemblies between said lowered positions and said raised positions;

(g) a ground engaging wheel assembly connected to said main scraper frame and including a wheel assembly frame pivotally connected to said main scraper frame to enable pivoting about a transverse wheel frame axis;

(h) at least a pair of ground engaging wheels journaled on said wheel assembly frame to enable rotation of said wheels about a transverse wheel rotation axis;

(i) a linear wheel assembly motor engaged between said scraper main frame and said wheel assembly frame and selectively operable to move said wheel assembly between a lowered position with said wheel engaging said soil surface thereby raising said main blade out of engagement with said soil surface and a raised position with said wheel out of engagement with said soil surface thereby lowering said main blade into engagement with said soil surface;

(j) a main blade reinforcement channel member having a rear web and a pair of forwardly extending flanges including an upper flange and a lower flange, said flanges being secured to a rear surface of said main blade at said intermediate segment;

(k) an upper brace plate extending transverse to said main scraper frame and having a top edge secured to said transverse frame member in spaced relation to said upper edge of said main blade and a bottom edge secured to said channel member along said upper flange; and (l) a plurality of lower gusset plates positioned in transversely spaced relation and having upper edges secured to said channel member along said lower flange and front edges secured to said main blade between said intermediate segment and said lower edge of said main blade.

17. An apparatus as set forth in claim 16 wherein:

(a) said wheel assembly frame is pivotally connected to said channel member to enable pivoting about said wheel frame axis.

18. An apparatus as set forth in claim 17 wherein said wheel support frame includes:

(a) at least two wheel frame support lugs extending rearwardly from said channel member in transversely spaced relation;

(b) a wheel frame axle journaled through said support lugs;

(c) at least two wheel support arms connected to said axle and extending radially therefrom in a substantially rearward direction relative to said scraper main frame;

(d) a respective ground engaging wheel journaled on each wheel support arm; and (e) said wheel assembly motor including a pair of linear wheel frame motors, each wheel frame motor being pivotally connected at opposite ends to said scraper main frame and a respective one of said wheel support arms.

19. A drawn land scraper apparatus comprising:

(a) a transversely extending main scraper frame having opposite lateral ends;

(b) a draft tongue extending forwardly from said main scraper frame and enabling hitching said apparatus to a draft vehicle;

(c) a main scraper blade extending transverse to said main scraper frame, depending from said main scraper frame, and configured to grade a soil surface upon engaging same when said apparatus is drawn by said draft vehicle, said main scraper frame having a transverse frame member and being curved from an upper edge through an intermediate segment to a lower edge about a transverse main blade axis, said upper edge of said main blade being secured to said transverse extending frame member;

(d) a pair of wing scraper blade assemblies pivotally connected to respective opposite ends of said main scraper frame, each wing blade assembly including a respective wing blade member configured to grade said soil surface in a respective lowered position and having a respective raised positioned pivoted out of engagement with said soil surface;

(e) a wing motor engaged between said main scraper frame and said wing blade assemblies and selectively operable to pivot said wing blade assemblies between said lowered positions and said raised positions;

(f) a ground engaging wheel assembly connected to said main scraper frame and including at least one ground engaging wheel;

(g) a wheel assembly motor engaged between said main scraper frame and said wheel assembly and selectively operable to move said wheel assembly between a lowered position with said wheel engaging said soil surface thereby raising said main blade out of engagement with said soil surface and a raised position with said wheel out of engagement with said soil surface thereby lowering said main blade into engagement with said soil surface;

(h) a main blade reinforcement channel member having a rear web and a pair of forwardly extending flanges including an upper flange and a lower flange, said flanges being secured to a rear surface of said main blade at said intermediate segment;

(i) an upper brace plate extending transverse to said main scraper frame and having a top edge secured to said transverse frame member in spaced relation to said upper edge of said main blade and a bottom edge secured to said channel member along said upper flange; and (j) a plurality of lower gusset plates positioned in transversely spaced relation and having upper edges secured to said channel member along said lower flange and front edges secured to said main blade between said intermediate segment and said lower edge of said main blade.

20. An apparatus as set forth in claim 19 wherein:

(a) said wheel assembly includes a wheel assembly frame pivotally connected to said channel member to enable pivoting about a transverse wheel frame axis.

21. A drawn land scraper apparatus comprising:

(a) a laterally extending main scraper frame having opposite lateral ends;

(b) a hitch assembly extending forwardly from said main scraper frame and enabling hitching said apparatus to a draft vehicle;

(c) a main scraper blade extending transverse to said main scraper frame, depending from said main scraper frame, and configured to grade a soil surface upon engaging same when said apparatus is drawn by said draft vehicle, said main scraper frame having a transverse frame member and being curved from an upper edge through an intermediate segment to a lower edge about a transverse main blade axis, said upper edge of said main blade being secured to said transverse frame member;

(d) a wing scraper blade attached to a wing frame which, in turn, is pivotally connected to one of said ends of said main scraper frame, said wing blade being configured to grade said soil surface in said lowered position of said wing frame and being pivoted out of engagement with said soil surface when in said raised position;

(e) a wing motor engaged between said main scraper frame and said wing frame and selectively operable to pivot said wing blade between said lowered position and said raised position;

(f) a main blade reinforcement channel member having a rear web and a pair of forwardly extending flanges including an upper flange and a lower flange, said flanges being secured to a rear surface of said main blade at said intermediate segment;

(g) an upper brace plate extending transverse to said main scraper frame and having a top edge secured to said transverse frame member in spaced relating to said upper edge of said main blade and a bottom edge secured to said channel member along said upper flange; and (h) a plurality of lower gusset plates positioned in laterally spaced relation and having upper edges secured to said channel member along said lower flange and front edges secured to said main blade adjacent said lower edge of said main blade.

* * * * *